3,409,970
TURBINE REAR GAS SEAL REPLACEMENT
FIXTURE ON J-57 ENGINE
Dante C. Di Pietra, 1108 Elwood St.,
Rome, N.Y. 13440
Original application Mar. 23, 1964, Ser. No. 354,185, now Patent No. 3,286,335, dated Nov. 22, 1966. Divided and this application Aug. 12, 1966, Ser. No. 572,161
8 Claims. (Cl. 29—200)

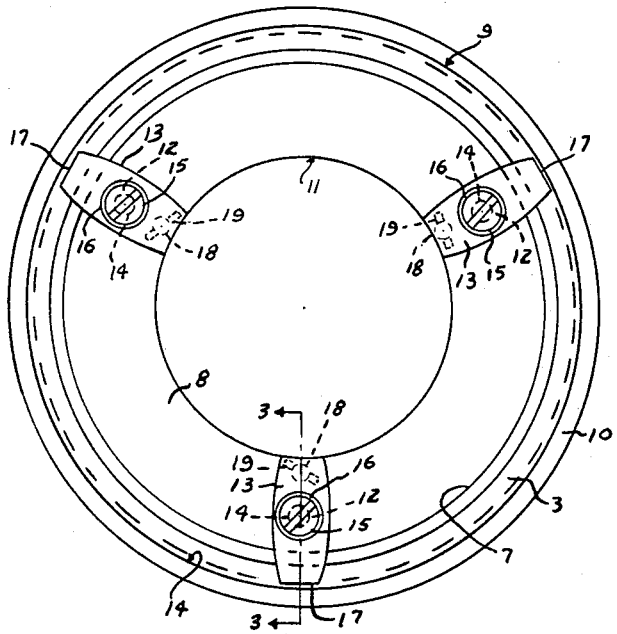
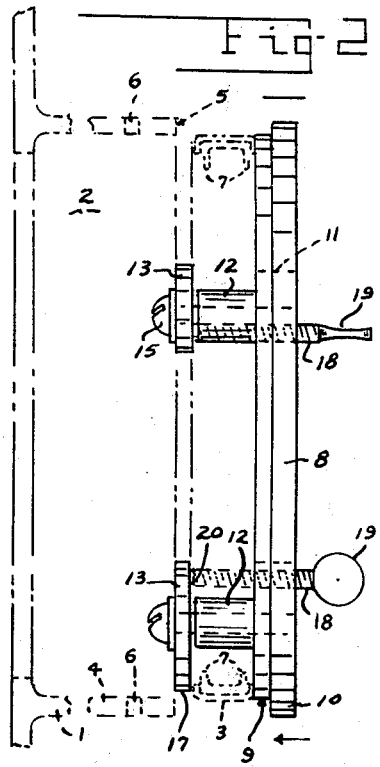
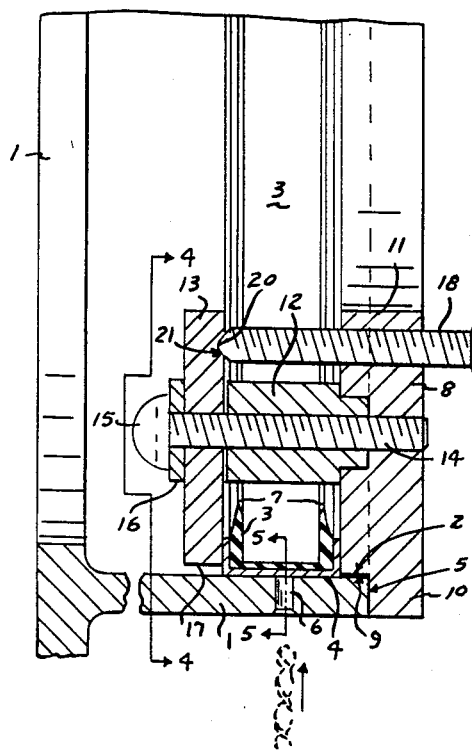
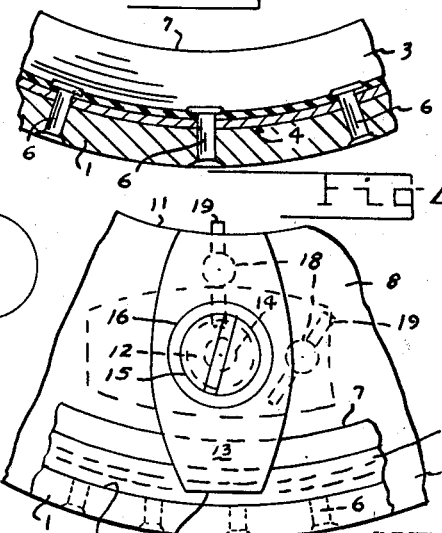
Nov. 12, 1968     D. C. DI PIETRA     3,409,970
TURBINE REAR GAS SEAL REPLACEMENT FIXTURE ON J-57 ENGINE
Original Filed March 23, 1964
INVENTOR
DANTE C. DI PIETRA
BY Harry A. Herbert Jr
and Charles H. Wagner
ATTORNEYS United States Patent Office 3,409,970
Patented Nov. 12, 1968

The invention described herein may be manufactured and used by or for the United States Government for governmental purposes without payment to me of any royalty thereon.

This is a division of my copending application Ser. No. 354,185, filed Mar. 23, 1964, now Patent No. 3,286,-335 granted Nov. 22, 1966.

This invention relates to an improved fixture or device for the accurate replacement of annular gas seals for turbojet engines and more particularly for the replacement of rear shaft gas seals on J–57 engines having, for an object, the handling of these annular gas seals to prevent injury or damage thereof during the replacement, and providing means for supporting and positioning of the seals in the engine whereby these annual seals may be accurately drilled for the securing rivets while seated and securely held in their required position in the engine by the fixture.

A further object is the provision of a combined clamp and gauge device for placing in position a gas seal ring in the rear shaft bearing support housing of a gas turbine engine, particularly a J–57 engine, and maintaining it in position during the drilling step in the gas seal ring fastening procedure.

A further object is the provision of a simple, inexpensive, and time saving fixture for temporarily positively supporting an annular ring member for insertion and accurate positioning in a complemental ring receiving annular opening in a predetermined axial position in the opening during the ring fastening operation, in which said fixture is easily released and removed from the ring and the opening without danger of injury to the ring or to the surface of the opening.

A further object is the provision of a simple and handy fixture as indicated above, which may also be employed for removing a damaged ring or gas seal from its seat or opening in the engine, as well as easily, conveniently, and accurately employed for supporting and positioning a new or replacement ring or annular gas seal in its receiving opening or seat.

A further object is the provision of a gas turbine rear shaft gas seal replacement fixture with comprises a circular disk or plate having a large central access opening therethrough and a peripheral portion to fit and be received in the turbine rear shaft gas seal receiving opening of a turbojet engine with an outer peripheral stop flange for limiting the amount of axial insertion of the plate in the opening, together with a plurality of spaced, rotatably adjustable clamp members carried by the inner face of the plate in spaced relation thereto for the reception and clamping of an annular gas seal member having a diameter substantially equal to the diameter of the plate, for insertion and positioning in the seal receiving opening, and the inclusion of manually operable clamp screws threadably extending through the plate beyond the side thereof remote from the clamp members for engaging and adjusting the clamp members into clamping and securing relation with one side of the gas seal to hold the seal centered on the plate during replacement thereof in the seal receiving opening, whereby the clamps may be rotated 90° to disengage the seal and permit removal of the fixture, leaving the gas seal accurately positioned in its seal receiving opening.

Other objects and advantages of the invention will become apparent from the following description and accompanying drawings in which like reference characters refer to like parts in the several figures.

FIGURE 1 is a plan view of the improved gas turbine rear shaft gas seal replacement device or fixture showing the inner side thereof with the clamp members in operative position, and an annual rear shaft gas seal member centered and clamped therein against the apertured plate of the fixture, ready for insertion and positioning in the turbine rear bearing support assembly;

FIGURE 2 is a side elevation of the fixture shown in FIGURE 1 with a new or replacement gas seal shown in dotted lines in position on the fixture, with the gas seal receiving structure or turbine rear bearing support shown in dot-and-dash lines but with the fixture in position for inserting the seal in position in its receiving opening of the support;

FIGURE 3 is an enlarged fragmentary radial sectional view, taken about on the plane indicated by line 3—3 in FIGURE 1, showing the fixture, with the gas seal ring seated in the housing or bearing support, ready for the drilling procedure, and depicting a drill for this purpose in dotted lines;

FIGURE 4 is a fragmentary elevation of the fixture, taken about on line 4—4 in FIGURE 3, with one of the retainer clamps for the gas seal shown in operative clamping position in full lines, and in release position in dotted lines, whereby the fixture can be removed, leaving the gas seal in its proper position in the housing; and FIGURE 5 is a fragmentary sectional view taken about on line 5—5 in FIGURE 3, showing the replacement seal after it has been drilled and riveted in position, and the fixture of the invention has been removed.

In the drawings the reference numeral 1 denotes a cylindrical bearing receiving and supporting structure having a circular opening 2 for receiving and supporting an annular or circular ring member 3, in this case the member 1 comprising the rear bearing support housing of a turbojet engine, more particularly a J-57 engine having an inner cylindrical wall surface 4 for receiving and supporting the ring member 3 which comprise the turbine rear bearing gas seal of a turbojet engine, more particularly a J-57 engine. This annular seal 3 is secured in position at a predetermined axial distance from the outer end 5 of the cylindrical seal receiving opening by a plurality of rivets 6 which must be removed by center punching the heads, drilling therethrough, and punching the rivets 6 out before the seal can be removed and replaced. This becomes necessary when the inside diameters or edge 7 of the turbine rear shaft gas seals 3 become burred, dented, scored, uneven, or damaged in any way so as not to make a perfect seal with the rear bearing shaft (not shown). These edges 7 are fairly sharp and can therefore be easily damaged. Furthermore, the replacement seals are not drilled for the retaining rivets 6 and must be drilled while held in place to suit the rivet holes already in the housing 1. Normally this operation, including the insertion of the ring seal in precise axial position and holding the same in proper position so that the rivet holes, when drilled, will come midway between the spaced annular lips without injury to the delicate edges 7 in the process was a difficult, delicate, and time consuming operation. The improved seal supporting and positioning fixture of the invention reduces this seal replacement operation to a simple, easy, quick and accurate operation.

The fixture comprises a rigid circular plate or disk 8 having a circular periphery 9 of predetermined thickness adapted to fit into the inner diameter 2 of the rear bearing housing 1 with substantially little or no play, the disk 8 having an annular outer peripheral stop flange 10 for positioning engagement with the outer end 5 of the housing 1. The plate or disk 8 is formed with a large concentric access opening 11 therethrough for insertion of temporary bolt and nut fasteners through the rivet holes 6 in the housing 1 and holes which are inwardly drilled through the periphery of the seal 3 in alignment with the holes in the housing for the rivet 6 while the seal is being accurately held in place during the drilling procedure.

The inner face of the plate 8 carries a plurality of pivot posts 12, as best seen in FIGURES 2 and 3, on which are rotatably adjustably, and somewhat loosely pivoted the clamping or adjustable seal retaining finger members 13, being pivoted on threaded, headed members or stems 14 and retained by the heads 15, with suitable and preferably resilient washers 16 therebetween. The outer ends 17 of the retaining or clamping members 13, when in operative position as seen in FIGURES 3 and 4, lie in on a circle which has a radius less than the radius of the outer surface of the gas seal ring 3.

Spaced radially inward from each of the posts 12 and threadably extending through the plate 8 are threaded clamp screws 18 each having a manual manipulating handle or thumb piece 19, being in the nature of a thumb screw with the outer extremity 20 adapted to engage and tilt the pivoted clamp 13 (when in radial position) into clamping engagement with the side of the seal ring 3 and clamp the same in a plurality of points in concentric position against the inner face of the plate 8, flush with the circular portion 9 thereof.

If desired, the centrally pivoted clamping members on fingers 13 may be provided with slight depressions or "dwells" 21, as seen in FIGURE 3, to assist in holding the clamping fingers 13 in radial operative positions while the thumb screws 18 are being tightened to hold the seal ring 3 in position on the plate 8, and prevent the fingers from turning from their radial clamping positions until the thumb screws 18 are fully loosened.

In the method employed, assuming that a seal is to be replaced, the heads of the rivets 6 are center punched and drilled through, after which the rivets are punched out leaving the surface 4 with the rivet receiving holes therein. The old or damaged gas seal is now free for removal and this can be accomplished by axial outward withdrawal. If the sealing ring 3 cannot be withdrawn easily, the fixture may also be used for this purpose by inserting the reduced circular portion 9 into the bearing receiving support 1 until the flange 10 abuts the end or shoulder 5 and rotating pivoted fingers to engage over the side of the seal. The thumb screws may be tightened, after which the plate 8 is accessible for withdrawal, thus withdrawing the annular gas seal out of the housing 1.

When the old seal has been removed a new gas seal is placed concentrically on the fixture or plate 8 and the fingers 13 clamped down against the side of the seal 3 by tightening the thumb screws 18. This secures the gas seal ring in concentric substantially aligned relation with the periphery or pilot portion 9 of the plate. It should be observed that the distance from the shoulder between the flange 10 and the inner side of the plate 8 against which the seal is clamped is predetermined to equal the initial desired distance from the outer end 5 of the housing to the adjacent side of the annular gas seal ring 8 when in place, relative to the holes for the rivets 6.

Therefore, when the fixture, carrying the gas seal, is inserted and forced down to dispose the shoulder or flange 10 against the outer edge 5, the seal is securely, accurately, and positively held in its desired predetermined position for locating the central plane between the lips 7 coincident to the plane through the centers of the openings for the rivets 6.

With the gas sealing ring held in place by the "fixture" of the subject invention, a drill substantially the size of the rivet holes is inserted through the rivet holes and operated to drill through the base of the seal, for instance in four different (N., S., E. and W.) radial directions, after which bolts are inserted through these holes, and nuts applied and tightened. These may be inserted through the access opening 11. This operation positively holds the gas seal ring 3 in the desired predetermined location and the drill can now be operated to drill out the remainder of the rivet holes through the base of the seal. The fingers 13 can now be rotated to their inoperative positions (as seen in FIGURE 4 in dotted lines) and the fixture of the subject invention removed (after the four or more) initial holes are drilled, bolts inserted, and nuts threaded thereon and tightened.

In the next step, rivets are inserted from the inside and the heads pressed against the inside of the seal and the desired tool is employed to expand the tails to thereby clinch the rivets 6 in place to secure the gas seal firmly and permanently in position. The four temporary bolts can now be removed and the remaining rivets inserted and clinched.

For purposes of exemplification, a particular embodiment of the invention has been shown and described to the best understanding thereof. However, it will be apparent that minor changes and modifications in the arrangement and construction of the parts thereof may be resorted to without departure from the true spirit and scope of the invention as defined in the accompanying claims.

I claim:

1. A fixture for replacing circular rear gas seals in rear shaft bearing support housings in turbojet engines having a cylindrical housing for receiving the seal which is formed with a plurality of radial rivet receiving holes therein disposed in a plane normal to the axis of the housing in predetermined spaced relation from the seal receiving end of the housing for receiving rivets for securing the gas seal in predetermined position in the housing comprising: a circular plate shaped to fit and be guidably received into the cylindrical housing having a circular gas seal supporting surface on one side thereof for positioning the circular gas seal thereon in concentric contacting relation thereto, clamping means carried by said plate for removably securing said seal against said surface in concentric relation for insertion of said plate and said seal thereon into said housing, said plate having an annular radially projecting stop flange adjacent the opposite side thereof spaced a predetermined distance from said surface, aforesaid distance equal to the distance from the seal receiving end of the housing to a transverse plane through the centers of the rivet receiving holes less one-half of the thickness of said circular gas seal, whereby when said annular gas seal is concentrically clamped thereon and inserted into said housing for replacement said stop flange limits the degree of insertion and position of said plate into said housing to position and support said seal in said housing to dispose a median plane between the opposite side faces of the seal coincident with the aforesaid plane through the rivet holes, whereby the base of the seal can be drilled through said rivet holes to dispose rivets for securing the seal in the housing midway between the opposite faces of the seal.

2. A circular plate having an inner seal supporting face, an annular peripheral stop flange and a reduced diameter circular pilot portion forming an annular stop shoulder parallel to said face in predetermined spaced relation to said face, said plate having a large concentric access opening therethrough, a plurality of circumferentially spaced pivot posts fixed on and projecting from said face remote from said shoulder and parallel to the axis of said plate intermediate the periphery of said plate and the edge of said access opening, a clamping finger pivoted intermediate its ends on each of said posts, substantially parallel to said face for rotative adjustment between a radial clamping position having an outer end lying in a circle concentric to and spaced slightly inward from the periphery of said pilot portion, and spaced from said face of said pilot portion a distance substantially equal to the thickness of an annular gas seal ring to be clamped thereby, clamping screws threaded perpendicularly through said plate in radial planes through the center of said plate and each of said posts, intermediate the posts and the access opening, said screws each having one end thereof in impinging contact with one of the fingers, intermediate said posts and said opening, said screws having actuating means on the opposite ends thereof for rotating said screws for tilting said fingers to clamp the outer free ends thereof into clamping and holding contact on one side face of an annular gas seal disposed concentrically on said plate, intermediate the fingers and said face of said plate, said fingers being rotatably adjustable on the axis of said posts substantially 90° to disengage said seal, for removal of said plate from said seal after said seal has been inserted into a complementary seal receiving housing.

3. A special replacement fixture for replacing circular rear shaft bearing gas seals in cylindrical rear shaft bearing support housings of gas turbine engines adapted to receive said seals and formed with a plurality of rivet receiving radial holes disposed in a plane normal to the axis of the housing in predetermined spaced relation from the gas seal receiving end of the housing for receiving rivets for securing said seals in predetermined position in said housing comprising: a circular pilot plate shaped to guidingly fit and be axially received into said housing, said plate having a gas seal supporting surface on one side thereof, and a peripheral overhanging stop flange adjacent the opposite side, spaced from the first mentioned side a distance equal to the distance from the outer seal receiving end of the housing to a transverse plane through the centers of the rivet holes less one-half the distance between the opposite faces of the seal to position said seal supporting fixture in said housing to dispose a median plane through the base of said seal between said faces of said seal in coincident relation with the aforesaid plane through the centers of the rivet holes, a plurality of releasable clamp members carried by said seal supporting surface in axially spaced relation thereto to receive and clamp the circular gas seal against said supporting surface in concentric relation to said pilot plate, whereby when the plate with the annular gas seal concentrically clamped thereon is inserted into the receiving end of the housing said stop flange engagement with the receiving end of said housing will accurately position and rigidly support said seal in predetermined spaced relation to said receiving end to dispose a median plane between the opposite faces of the seal in coincident parallel relation to said plane through rivet holes, whereby said seal may be drilled through said rivet holes in said housing in said plane midway between the opposite faces of the seal.

4. A fixture for rigidly supporting and positioning a circular rear shaft bearing gas seal for a gas turbine engine for drilling and riveting in predetermined accurate position in a complemental receiving housing in a gas turbine engine comprising: a flat circular plate having a diameter exceeding the diameter of the seal receiving end of the housing having a concentric reduced diameter projecting pilot portion for guiding insertion into said receiving end of said housing to form a stop shoulder with said first mentioned diameter for limiting the depth of insertion of the pilot portion into the housing, a plurality of circumferentially spaced releasable clamping fingers carried by the outer end of said pilot portion for releasably clamping and holding the circular gas seal against the outer end of said pilot portion for insertion thereof to a predetermined position in said housing when the larger diameter portion of said plate impinges the seal receiving outer end of the housing.

5. A fixture as set forth in claim 4 in which said plate is formed with a large concentric access opening therethrough for inserting rivet or bolt securing means from the inside through holes drilled through the base of the seal in alignment with the rivet holes in the housing, with the heads of the fastening means impinging the inside of the base of the seal, said access opening forming access means for releasing said clamping fingers from said seal to provide for withdrawal of said pilot portion from said housing, leaving said gas seal secured in predetermined position in said housing.

6. A rear gas seal replacement fixture for gas seals in rear shaft bearing support housings in gas turbine engines comprising: a circular flat plate having a projecting pilot end to fit into said housing having a stop shoulder spaced axially a predetermined distance from the outer extremity of said pilot end for limiting insertion of said pilot end into said housing, said plate having a large concentric access opening therethrough, a plurality of pivot posts projecting outwardly from the outer end of said pilot portion parallel to the axis thereof in equal circumferentially spaced relation to each other substantially midway between the periphery of said pilot end and the edge of said access opening, a clamping finger pivoted substantially midway between its ends on the outer end of each of said posts for rotative adjustment in a plane normal to the axis of said pilot end and spaced outwardly from the outer extremity of said pilot end, adjustable between radial clamping positions and release positions substantially normal to said radial positions, said fingers having outer clamping ends, when in radial clamping position, extending outwardly not greater than a circle concentric to the axis of said pilot end having a radius equal to the radius of said pilot portion for receiving and clamping a circular gas seal for said engine between the outer extremity of said pilot end and the outer end portions of said fingers, said fingers being tiltable on said posts normal to said rotative adjustment movements thereof, thumb screws extending through said plate parallel to the axis thereof located between said posts and the edge of said access opening in radial planes through the axis of said posts and the axis of said pilot end, for impinging engagement with the inner ends of said clamping fingers for tilting the outer ends thereof into clamping engagement with the side of a gas seal when positioned between the outer extremity of said pilot end and said fingers.

7. A fixture for replacing circular rear gas seals in the rear shaft bearing support housings of gas turbine engines comprising: a circular plate having an annular projecting stop flange thereon disposed in predetermined axially spaced relation from one end to limit the insertion of the fixture into the housing, said plate having a concentric circular access opening therethrough, a plurality of seal clamping fingers pivotally and rotatably mounted on the outer extremity of said plate remote from said flange in radially spaced concentric relation to the center of said plate for tilting displacement in radial planes through said center and rotatable to inoperative positions in planes normal to said radial planes, thumb screws threaded through said plate for tilting impingement on said fingers when in said radial planes to clamp the seal between the ends of the fingers and said one end.

8. A fixture of the class described comprising a cylindrical plate having an outer cylindrical pilot portion of predetermined diameter and an enlarged annular stop flange disposed in predetermined axially spaced relation to the outer end of said pilot portion, at least three equal circumferentially spaced centrally pivoted clamping fingers carried by said outer end in predetermined axially spaced relation thereto for tilting movement in radial planes through the axis of said plate, said fingers having their outer ends located inwardly of a circle concentric to said pilot portion having the same radius as said pilot portion, said fingers being mounted on said plate for rotative adjustment to inoperative positions in planes normal to the axis of said plate for moving the ends of said clamping fingers inwardly, thumb screw means carried by said plate for impinging and tilting said clamping fingers to move the outer ends thereof toward said outer end of said pilot portion, said plate having a large concentric access opening therethrough for access to said clamping fingers for the purpose of rotating the same between operative and inoperative positions.

References Cited

UNITED STATES PATENTS 2,377,965   6/1945   Rataiczak.
2,751,669   6/1956   Crumpacker et al.
3,286,335   11/1966  Di Pietra _____ 29—401

THOMAS H. EAGER, *Primary Examiner.*